(12) United States Patent
Ebner

(10) Patent No.: US 10,440,221 B2
(45) Date of Patent: Oct. 8, 2019

(54) LOCATION TRACKING SYSTEM FOR NETWORKED PRINT DEVICES IN AN ENVIRONMENT

(71) Applicant: Xerox Corporation, Norwalk, CT (US)

(72) Inventor: Fritz Francis Ebner, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 84 days.

(21) Appl. No.: 15/581,047

(22) Filed: Apr. 28, 2017

(65) Prior Publication Data

US 2018/0316822 A1 Nov. 1, 2018

(51) Int. Cl.
*H04N 1/327* (2006.01)
*H04W 64/00* (2009.01)
*H04N 1/00* (2006.01)

(52) U.S. Cl.
CPC ..... *H04N 1/32773* (2013.01); *H04N 1/00344* (2013.01); *H04W 64/003* (2013.01); *H04N 2201/0094* (2013.01); *H04N 2201/3205* (2013.01); *H04N 2201/3221* (2013.01); *H04N 2201/3253* (2013.01)

(58) Field of Classification Search
None
See application file for complete search history.

(56) References Cited

U.S. PATENT DOCUMENTS

| | | | |
|---|---|---|---|
| 8,934,112 B1 | 1/2015 | Gross et al. | |
| 8,982,384 B2 | 3/2015 | Evanitsky | |
| 8,986,867 B2 | 3/2015 | Baek | |
| 9,201,619 B2 | 12/2015 | Gross et al. | |
| 9,367,271 B2 | 6/2016 | Zehler et al. | |
| 2004/0075861 A1* | 4/2004 | Shima | G06F 21/608 358/1.15 |
| 2014/0022587 A1 | 1/2014 | Coccia et al. | |
| 2017/0123737 A1* | 5/2017 | Januszewski | G06F 3/126 |
| 2017/0289813 A1* | 10/2017 | Pashkov | H04W 12/10 |
| 2018/0237137 A1* | 8/2018 | Tovey | B64C 39/024 |

FOREIGN PATENT DOCUMENTS

JP 2009187103 A * 8/2009

OTHER PUBLICATIONS

Information about Related Patent and Patent Applications, see section 6 of the accompanying Information Disclosure Statement Letter, which concerns Related Patents and Patent Applications

* cited by examiner

*Primary Examiner* — Fan Zhang
(74) *Attorney, Agent, or Firm* — Fox Rothschild LLP

(57) ABSTRACT

A system of tracking a location of a print device in an environment. For each of one or more users of a print device during a time period, the system identifies an event that is initiated at the print device over a network where the event is associated with the user and a print job, and determines whether the user is registered with the location tracking system. In response to determining that the user is registered with the location tracking system, the system determines a login location of the user, determines whether the login location is current, and in response to determining that the login location is current, stores the one or more location coordinates in a data store such that they are associated with the print device. The system estimates a location of the print device, and provides the location of the print device to an asset management system.

18 Claims, 5 Drawing Sheets

LOCATION TRACKING SYSTEM FOR NETWORKED PRINT DEVICES IN AN ENVIRONMENT

BACKGROUND

Providers and operators of print devices, such as multi-function print devices, have an interest in tracking the location of such print devices. Missing devices cause significant lost revenue, and relocating devices results in significant labor costs.

Current tracking solutions involve attaching beacons to devices that are to be tracked, and using an array of wireless access points to track the devices' location based on signal strength of the beacons. However, these solutions incur non-trivial costs to install and maintain the beacons. In addition, the hardware has to be accepted into security-conscious environments.

The methods and systems described in this disclosure overcome many of the deficiencies of known tracking systems by tracking activities of print device users rather than the print devices themselves. This solution does not typically require any additional hardware, and therefore does not incur any additional hardware or infrastructure costs, or require any configuration or monitoring for compliance with security protocols.

SUMMARY

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

In an embodiment, a system of tracking a location of a print device in an environment includes an electronic device and a computer-readable storage medium that includes one or more programming instructions that, when executed, cause the electronic device to perform one or more actions. For each of one or more users of a print device during a time period, the system identifies an event that is initiated at the print device over a network where the event is associated with the user and a print job, and determines whether the user is registered with the location tracking system. In response to determining that the user is registered with the location tracking system, the system determines a login location of the user, determines whether the login location is current, and in response to determining that the login location is current, storing the one or more location coordinates in a data store such that they are associated with the print device. The login location represents a location of a user electronic device, the user electronic device is connected to the network, the print job is submitted to the print device via the user electronic device, and the login location is represented by one or more location coordinates. The system estimates a location of the print device based on the location coordinates, and provides the location of the print device to an asset management system.

The system may identify the event by identifying a print job that was released for processing over the network. One or more instructions for releasing the print job may be received at the print device.

The system may identify an event by identifying one or more of the following: a print job that was emailed from the print device, a print job that was scanned at the print device, a print job that was printed at the print device, a print job that was sent as a fax, a print job that was received as a fax, or a print job that was copied.

The system may determine whether the user is registered with the location tracking system by identifying a unique user identifier associated with the event, and determining whether a list of registered users of the location tracking system includes the unique user identifier.

Optionally, the system may determine whether the login location is current by determining whether a time of submission of the print job from the user electronic device is within a period of time from an initiation time of the event.

The system may determine the login location for the user by identifying a wireless access point in the environment that the user electronic device is accessing, identifying a location of the identified wireless access point, determining a strength of a connection between the user electronic device and the wireless access point, and estimating the login location based on the strength.

The system may estimate the location of the print device by determining a median value of the stored location coordinates for each of the one or more users during the time period, and assigning the median value as the location of the print device.

The system may determine that a second user has submitted a print job to the print device and determine a login location for the second user. The login location may represent a location of a user electronic device which the second user is using to access the network. The system may provide the second user, via the user electronic device of the second user, with an indication of the location of the print device. The system may provide the second user with one or more directions from the login location for the second user to the location of the print device.

DETAILED DESCRIPTION

Figure 1:
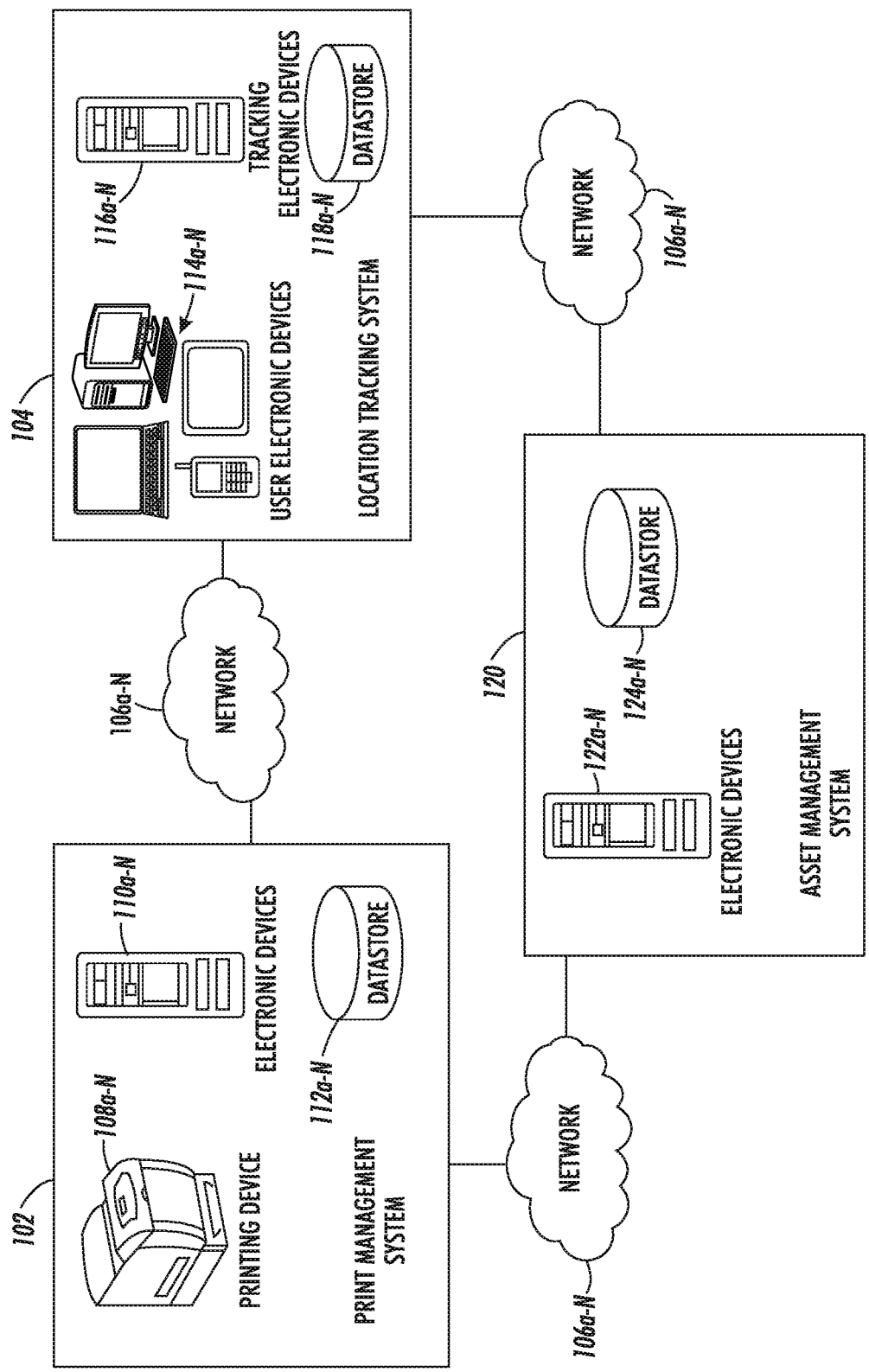
FIG. 1 illustrates an example tracking system for tracking the location of print devices according to an embodiment.

The following terms shall have, for purposes of this application, the respective meanings set forth below:

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

An "environment" refers to a location at which one or more print devices are present. Example environments include, without limitation, an office (or a floor, a building, or a portion thereof of an office), a manufacturing facility, a print shop and/or the like.

A "location tracking system" refers to a system that stores the location of one or more print devices in an environment.

A "print device" refers to a machine having hardware capable of reading a digital document file and use the information from the file and associated print instructions to print of a physical document on a substrate. Components of a print device typically include a print engine, which includes print hardware such as a print head, which may include components such as a print cartridge containing ink, toner or another print material, as well as a document feeding system configured to pass a substrate through the print device so that the print head can print characters and/or images on the substrate. In some embodiments, a print device may have additional capabilities such as scanning or faxing and thus may be a multifunction device.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

FIG. 1 illustrates an example tracking system 100 for tracking the location of print devices according to an embodiment. As illustrated by FIG. 1, the system 100 includes a print management system 102, a location tracking system 104, and an asset management system 120. The print management system 102, the location tracking system 104 and/or the asset management system 120 may communicate with one another via one or more communication networks 106a-N. A communication network 106a-N may be a local area network (LAN), a wide area network (WAN), a mobile or cellular communication network, an extranet, an intranet, the Internet and/or the like. In various embodiments, a print management system 102 may communicate with a location tracking system 104 (and vice versa) via a wireless network.

A print management system 102 may include one or more print devices 108a-N, one or more electronic devices 110a-N that communicate with the print devices via one or more communication networks, and one or more data stores 112a-N. A print management system may track print jobs processed by the print devices 108a-N. For example, a print management system may track a print job by a user that initiates the print job and a timestamp associated with when the print job is processed. The timestamp may be obtained from a clock for the print management system. At least a portion of this information may be stored in the one or more data stores 112a-N.

A location tracking system 104 may include one or more user devices 114a-N, one or more tracking electronic devices 116a-N and/or one or more data stores 118a-N. A user electronic device 114a-N refers to an electronic device via which a user is able to access the tracking electronic devices 116a-N. Example user electronic devices include, without limitation, desktop computers, laptop computers, tablets, mobile phones, smart watches and/or the like.

A tracking electronic device 116a-N may track a location of one or more user electronic devices. For instance, a tracking electronic device 116a-N may obtain a location associated with a user electronic device 114a-N at a certain time and identifiers associated with one or more users of the user electronic devices. At least a portion of this information may be stored in one or more data stores 118a-N.

An asset management system 120 includes one or more electronic devices and one or more data stores that store the location of one or more assets within an environment. An asset may be an electronic device or other item whose location is to be tracked.

Figure 2:
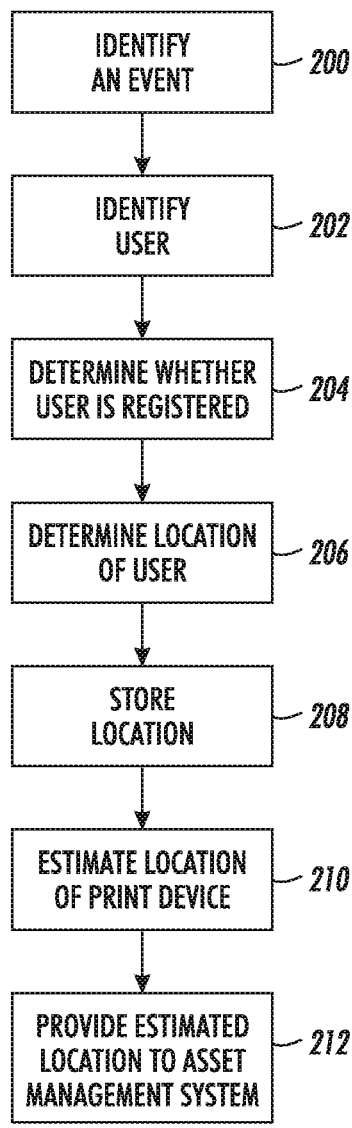
FIG. 2 illustrates a flow chart of an example method of tracking the location of print devices according to an embodiment.

FIG. 2 illustrates a flow chart of an example method of tracking the location of print devices according to an embodiment. As illustrated by FIG. 2, a location tracking system identifies 200 a processing event for a print job that occurs at a print device. A processing event refers to an action pertaining to a print job that is processed or that is to be processed by a print device. For instance, a processing event may be releasing a print job for printing a print job (including without limitation, secure print, mobile print, hold print, authenticated print), scanning a print job, scanning a print job to email, scanning a print job to repository, emailing a print job, sending a fax, receiving a fax, copying a print job, and/or the like. In certain embodiments, a user may initiate an event via a print device. For example, to initiate printing of a print job by a print device, a user may send the print job to the print device using an electronic device. However, the user may be required to manually release the print job from the print device in order to initiate printing. This may be a security protocol so that sensitive printed information is not left on the print device.

In various embodiments, a location tracking system identifies 200 a processing event by receiving information about one or more processing events from the print management system. Event information may include, without limitation, an indication of a type of the event (e.g., print, scan, email), a timestamp associated with when the associated print job is submitted to the print device (submission time or time of submission), a timestamp associated with when the processing event is initiated (initiation time), and/or the like. Table 1 illustrates example processing event information for a print device.

TABLE 1

| Print Device | Processing Event | Submission Time | Initiation Time |
|---|---|---|---|
| Print Device A | Printing | 08:23:45 | 10:34:09 |
| Print Device A | Scanning | 14:34:21 | 16:30:00 |
| Print Device A | Printing | 15:10:01 | 16:12:32 |

A print device may send event information to a location tracking system. Alternatively, a print device may store event information in one or more data stores, and a location tracking system may query the data stores for the information. The data stores may be a part of the print device itself, or they may be located remotely from the print device, such as, for example, elsewhere within the print management system.

A location tracking system identifies 202 a user associated with the identified processing event. An associated user may be a user that requested or initiated the identified processing event. For instance, a user may access a network, such as a network associated with the user's employer, by providing one or more credentials. Credentials include a unique user identifier for the user such as, for example, a user name, an employee number and/or the like. When a user submits a print job to a print device for processing, the submission includes the user's unique user identifier. As such, a location tracking system identifies 202 a user associated with the identified event by identifying the unique user identifier corresponding to the event. A print device may store the corresponding unique user identifier for an event with the event information in one or more data stores, and a location tracking system may query the data stores for the information. As mentioned above, the data stores may be a part of the print device itself, or they may be located remotely from the print device, such as, for example, elsewhere within the print management system.

The location tracking system determines 204 whether the user is registered with the location tracking system. A user may register with a location tracking system to allow the location tracking system to track the user's whereabouts within an environment. By tracking a user's whereabouts within an environment, a location tracking system can provide the user with targeted assistance within the environment. For instance, as discussed below in more details, the location tracking system may provide the user with directions to locations of interest within the environment from the user's current location. The location tracking system may also provide a user with relevant information about the environment based on the user's location. For instance, a location tracking system may notify a user of a problem with a print device that is nearby so the user can consider using a different print device until the problematic device is operational.

A user may register with a location tracking system by virtue of having network access. For instance, a user who has credentials to access an employer network may automatically be registered with a location tracking system for the employer network. Alternatively, a user may register separately with a location tracking system. In either situation, a user is provided with an opportunity to control whether the user's location is tracked and what information about the user's location is monitored and tracked by the location tracking system. In addition, certain information may be treated in one or more ways before it is stored or used so that personally identifiable information is removed. As such, a user has control over what information is collected and/or stored about the user and used by the system.

A location tracking system may determine 204 whether a user is registered with the location tracking system using the user's unique user identifier. The location tracking system may search one or more data stores of registered users for the user's unique user identifier. If the location tracking system locates the user's unique user identifier within the data stores, the location tracking system may determine that the user is registered with the location tracking system. Otherwise, the location tracking system may determine that the user is not registered with the location tracking system.

Alternatively, a location tracking system may determine 204 whether a user is registered with the location tracking system by searching to identify one or more users who are currently logged into the location tracking system or an associated network. A location tracking system may utilize one or more data stores that store access information for one or more location tracking system users. Access information may include, without limitation, an indication of a user who logs into the location tracking system, a timestamp associated with such login, information about whether the user is active and/or the like. Table 1 illustrates example access information according to an embodiment. As illustrated by Table 1, the access information includes a unique user identifier associated with a user and the time the user accessed a location tracking system or network. Table 1 also illustrates a timestamp associated with a most recent interaction by the user. A most recent interaction refers to

TABLE 1

| Unique User Identifier | Access Time |
|---|---|
| 3024 | 3/1/17 09:32:19 |
| 2781 | 3/1/17 11:21:07 |
| 3232 | 3/2/17 15:14:20 |
| 3005 | 3/3/17 7:01:32 |

If the location tracking system locates the user's unique user identifier within the stored access information, the location tracking system may determine that the user is registered with the location tracking system. Otherwise, the location tracking system may determine that the user is not registered with the location tracking system.

If the location tracking system determines that a user is registered with the location tracking system, the location tracking system determines 206 a location of the user.

A location of a user may refer to a login location of an electronic device via which the user accesses the location tracking system or an associated network. For instance, if a user accesses a location tracking system using the user's desktop computer, the location tracking system may determine a login location associated with the desktop computer. As another example, if a user accesses a network using the user's mobile device, the location tracking system may determine a login location associated with the mobile device.

As another example, a location of a user may refer to a location of an electronic device registered to or otherwise associated with the user. For instance, a user's mobile electronic device may be registered with a location tracking system. A location of a user may be estimated to be a location of the registered mobile electronic device as it may be assumed that users usually carry their mobile electronic devices with them as they move around an environment. As such, the location of a user electronic device may be indicative of the location of the user of the user electronic device.

A location tracking system may estimate a login location of an electronic device using an infrastructure of wireless access points. An environment may include wireless access points throughout at least a portion of the environment. A wireless access point (WAP) refers to a hardware electronic device that permits a wireless enabled electronic device to connect to a wired network. A WAP may be a standalone device which is positioned at various locations in the environment. Alternatively, a WAP may be a component of a router which is similarly positioned throughout an environment. The WAPs may be present in a high enough density to service an entire environment.

Figure 3:
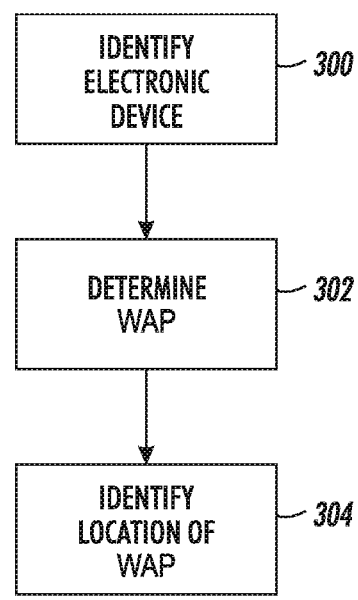
FIG. 3 illustrates a flow chart of an example method of determining a location of a user according to an embodiment.

FIG. 3 illustrates a flow chart of an example method of determining a location of a user according to an embodiment. As illustrated by FIG. 3, a location tracking system may identify 300 an electronic device that a user used to login to or otherwise access the location tracking system. In an embodiment, a location tracking system may identify 300 an electronic device that is associated with a user and registered with the location tracking system. An electronic device may be identified based on a unique identifier associated with the electronic device such as, for example, a media access control (MAC) address, an Internet Protocol (IP) address and/or the like. For instance, an electronic device may have a MAC address assigned to its network interface.

The location tracking system may determine 302 which WAP the identified electronic device is accessing. The location tracking system may maintain or have access to a data store that includes a listing of electronic device/WAP connections. The location tracking system may search the list for the unique identifier of the identified electronic device, and may identify a WAP to which it is connected.

The location tracking system identifies 304 a location of the identified WAP. The location tracking system may maintain or have access to a data store that includes a listing of WAPs and their corresponding locations within an environment. The locations may be designated by one or more location coordinates.

In an embodiment, a location tracking system may determine a strength of a connection between the identified electronic device and the identified WAP. The location tracking system may estimate the login location of the identified electronic device based on the strength of the connection between the identified electronic device and the identified WAP. For instance, if the strength is strong, the location tracking system may estimate a login location that is closer in proximity to the location of the identified WAP. Alternatively, if the strength of the connection is weak, the location tracking system may estimate a login location that is further in proximity to the location of the identified WAP. A login location may be estimated as a set of location coordinates.

In various embodiments, a location tracking system may determine whether a location of a user is current. Users may move around throughout an environment over time, and may access a location tracking system or network from a variety of different electronic devices over that time period. For example, a user may begin working from his or her desktop computer, but then move to a meeting in a different location in the environment and access the system or network from his or her tablet. A user may submit a print job from an electronic device and then initiate an event pertaining to that print job later after the user is no longer using the electronic device. As such, the system determines whether a user's location is timely in order to more accurately estimate the location of one or more print devices in the environment.

A user's location may be considered current if a user submits a print job to a print device from a user electronic device within a certain time period of initiating an event for the print job using the print device. For instance, the location of a user's desktop computer may be determined to be current for the user if the user released the print job for printing at the print device within thirty minutes from submitting the print job via the desktop computer. Additional and/or alternate time periods may be used within the scope of this disclosure.

In another embodiment, a user's location may be considered current if a user initiates an event within a certain time period from accessing a location tracking system or a network.

Referring back to FIG. 2, a location tracking system may store 208 the login location in a data store such that it is associated with the user and the print device.

As illustrated by FIG. 2, the process described above in steps 200-208 may be repeated for one or more other users of the print device over a period of time. For example, the process may be repeated for every user of a print device over a period of two hours. Additional and/or an alternate number of users or additional and/or alternate periods of time may be used within the scope of this disclosure. After completion of the time period, the system may have access to several estimated login locations associated with a print device based on several different user interactions with the print device.

Figure 4:
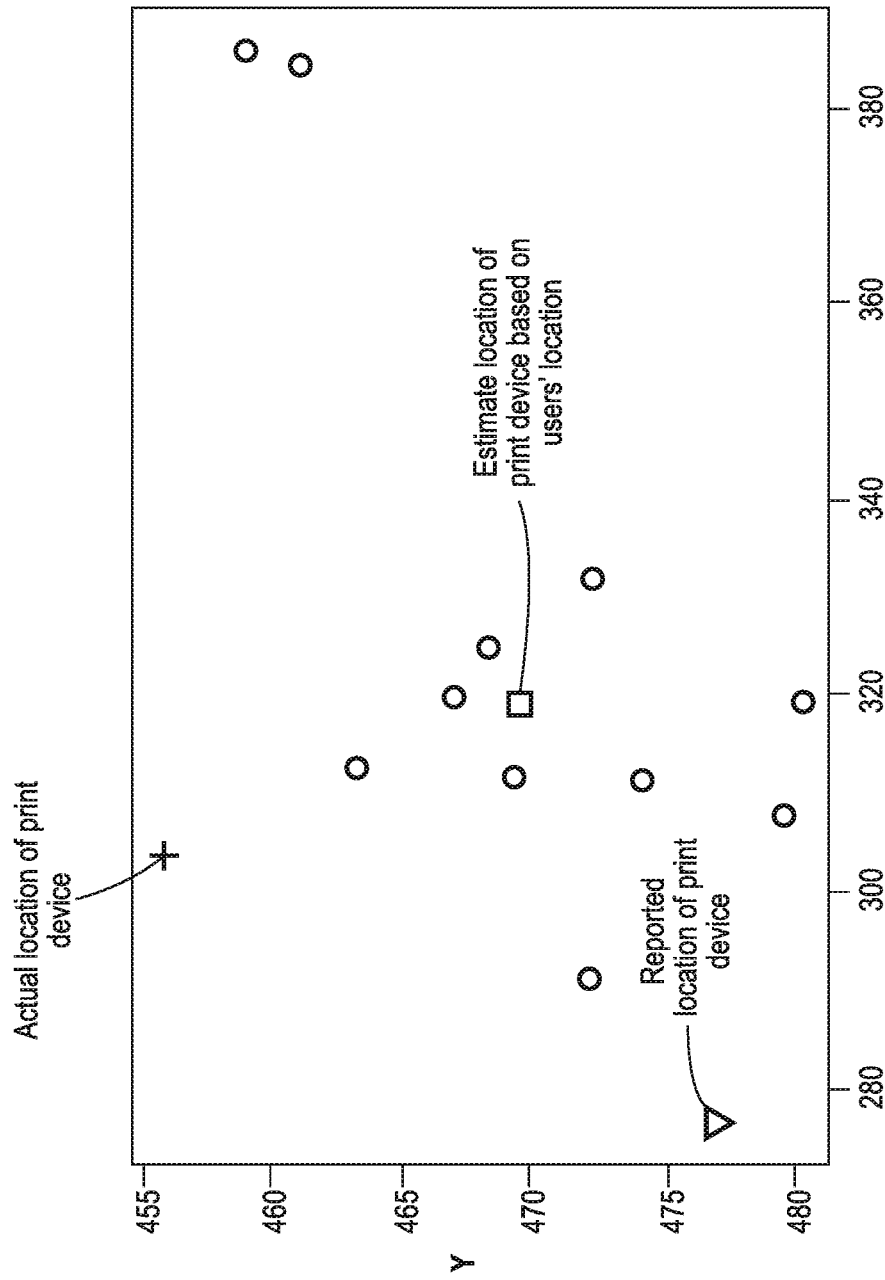
FIG. 4 illustrates a graph showing example estimated login locations for a print device according to an embodiment.

The location tracking system estimates 210 the location of the print device based on one or more of the estimated login locations. For example, a location tracking system may estimate 210 the location of a print device as the average or the median of the estimated login locations. FIG. 4 illustrates a graph showing example estimated login locations for a print device, an example estimated location for the print device, and an actual location for the print device according to an embodiment.

The location tracking system stores the estimated location of the print device. The location tracking system may provide 212 the estimated location of the print device to an asset management system. The asset management system may store the estimated location of the print device.

In certain embodiments, a system may use an estimated location for a print device to provide information about the print device to a user. For instance, a system may provide a user with an indication of the estimated location for a print device in response to the user submitting a print job to the print device. The indication may be a description of where the estimated location is (e.g., near column C2 on the first floor, east wing). Additionally and/or alternatively, the indication may include directions to the estimated location of the print device. The directions may include one or more directions from a user's location to the estimated location of the print device. The user's location may be a current location of a user. Alternatively, the user's location may be an estimated login location of an electronic device that the user used to access a location tracking system.

The system may have access to a diagram, such as a map or floorplan, of a user's environment. The system may use the diagram, the current location of the user and the estimated location of the print device to provide directions from the user's current location to the estimated location of the print device. For instance, the system may cause a visual representation of the diagram to be displayed at a user electronic device along with written or visual directions from the user's current location to the estimated location of the print device.

Figure 5:
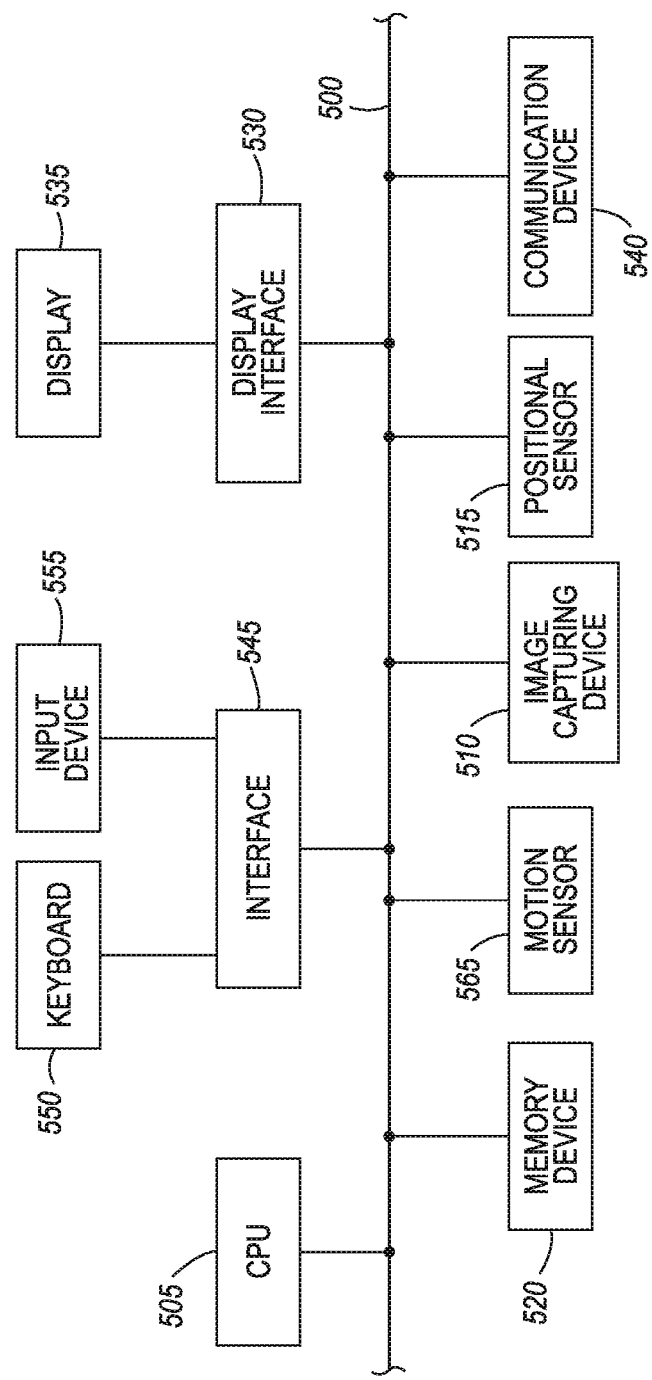
FIG. 5 illustrates a block diagram of example hardware that may be used to contain or implement program instructions according to an embodiment.

FIG. 5 depicts a block diagram of hardware that may be used to contain or implement program instructions, such as those of a cloud-based server, electronic device, virtual machine, or container. A bus 500 serves as an information highway interconnecting the other illustrated components of the hardware. The bus may be a physical connection between elements of the system, or a wired or wireless communication system via which various elements of the system share data. Processor 505 is a processing device that performs calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 520 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 535 in audio, visual, graphic or alphanumeric format. Communication with external devices, such as a printing device, may occur using various communication devices 540, such as a communication port or antenna. A communication device 540 may be communicatively connected to a communication network, such as the Internet or an intranet.

The hardware may also include a user input interface 545 which allows for receipt of data from input devices such as a keyboard or keypad 550, or other input device 555 such as a mouse, a touch pad, a touch screen, a remote control, a pointing device, a video input device and/or a microphone. Data also may be received from an image capturing device 520 such as a digital camera or video camera. A positional sensor 515 and/or motion sensor 565 may be included to detect position and movement of the device. Examples of motion sensors 565 include gyroscopes or accelerometers. An example of a positional sensor 515 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:

1. A method of tracking a location of a print device in an environment, the method comprising:
    for each of one or more users of a print device during a time period:
        identifying, by a location tracking system, an event that is initiated at the print device over a network, wherein the event is associated with the user and a print job,
    wherein the event comprises releasing the print job at the print device;
        determining whether the user is registered with the location tracking system, and
        in response to determining that the user is registered with the location tracking system:
            determining a login location of the user, wherein the login location represents a location of a user electronic device, wherein the user electronic device is connected to the network, wherein the print job is submitted to the print device via the user electronic device, wherein the login location is represented by one or more location coordinates,
            determining whether the login location is current by determining whether a time of submission of the print job from the user electronic device is within a period of time from a time that the print job is released at the print device, and
            in response to determining that the login location is current, storing the one or more location coordinates in a data store such that they are associated with the print device;
    estimating, by the location tracking system, a location of the print device based on the location coordinates; and
    providing the location of the print device to an asset management system.

2. The method of claim 1, wherein identifying the event comprises identifying a print job that was released for processing over the network.

3. The method of claim 2, wherein one or more instructions for releasing the print job are received at the print device.

4. The method of claim 1, wherein identifying the event comprises identifying one or more of the following:
    a print job that was emailed from the print device;
    a print job that was scanned at the print device;
    a print job that was printed at the print device;
    a print job that was sent as a fax;
    a print job that was received as a fax; or
    a print job that was copied.

5. The method of claim 1, wherein determining whether the user is registered with the location tracking system comprises:
    identifying a unique user identifier associated with the event; and
    determining whether a list of registered users of the location tracking system includes the unique user identifier.

6. The method of claim 1, wherein determining the login location for the user comprises:
    identifying a wireless access point in the environment that the user electronic device is accessing;
    identifying a location of the identified wireless access point;
    determining a strength of a connection between the user electronic device and the wireless access point; and
    estimating the login location based on the strength.

7. The method of claim 1, wherein estimating the location of the print device comprises:
    determining a median value of the stored location coordinates for each of the one or more users during the time period; and
    assigning the median value as the location of the print device.

8. The method of claim 1, further comprising:
    determining that a second user has submitted a print job to the print device;
    determining a login location for the second user, wherein the login location represents a location of a user electronic device which the second user is using to access the network; and
    providing the second user, via the user electronic device of the second user, with an indication of the location of the print device.

9. The method of claim 8, wherein providing the second user with the indication of the location of the print device comprises providing the second user with one or more directions from the login location for the second user to the location of the print device.

10. A system of tracking a location of a print device in an environment, the system comprising a location tracking system comprising:
an electronic device; and
a computer-readable storage medium comprising one or more programming instructions that, when executed, cause the electronic device to:
for each of one or more users of a print device during a time period:
identify an event that is initiated at the print device over a network, wherein the event is associated with the user and a print job, wherein the event comprises releasing the print job at the print device,
determine whether the user is registered with the location tracking system, and
in response to determining that the user is registered with the location tracking system:
determine a login location of the user, wherein the login location represents a location of a user electronic device, wherein the user electronic device is connected to the network, wherein the print job is submitted to the print device via the user electronic device, wherein the login location is represented by one or more location coordinates,
determine whether the login location is current by determining whether a time of submission of the print job from the user electronic device is within a period of time from a time that the print job is released at the print device, and
in response to determining that the login location is current, storing the one or more location coordinates in a data store such that they are associated with the print device,
estimate a location of the print device based on the location coordinates, and
provide the location of the print device to an asset management system.

11. The system of claim 10, wherein the one or more programming instructions that, when executed, cause the electronic device to identify the event comprise one or more programming instructions that, when executed, cause the electronic device to identify a print job that was released for processing over the network.

12. The system of claim 11, wherein one or more instructions for releasing the print job are received at the print device.

13. The system of claim 10, wherein the one or more programming instructions that, when executed, cause the electronic device to identify the event comprise one or more programming instructions that, when executed, cause the electronic device to identify one or more of the following:
a print job that was emailed from the print device;
a print job that was scanned at the print device;
a print job that was printed at the print device;
a print job that was sent as a fax;
a print job that was received as a fax; or
a print job that was copied.

14. The system of claim 10, wherein the one or more programming instructions that, when executed, cause the electronic device to determine whether the user is registered with the location tracking system comprise one or more programming instructions that, when executed, cause the electronic device to:
identify a unique user identifier associated with the event; and
determine whether a list of registered users of the location tracking system includes the unique user identifier.

15. The system of claim 10, wherein the one or more programming instructions that, when executed, cause the electronic device to determine the login location for the user comprise one or more programming instructions that, when executed, cause the electronic device to:
identify a wireless access point in the environment that the user electronic device is accessing;
identify a location of the identified wireless access point;
determine a strength of a connection between the user electronic device and the wireless access point; and
estimate the login location based on the strength.

16. The system of claim 10, wherein the one or more programming instructions that, when executed, cause the electronic device to estimate the location of the print device comprise one or more programming instructions that, when executed, cause the electronic device to:
determine a median value of the stored location coordinates for each of the one or more users during the time period; and
assign the median value as the location of the print device.

17. The system of claim 10, wherein the computer-readable storage medium further comprises one or more programming instructions that, when executed, cause the electronic device to:
determine that a second user has submitted a print job to the print device;
determine a login location for the second user, wherein the login location represents a location of a user electronic device which the second user is using to access the network; and
provide the second user, via the user electronic device of the second user, with one or more directions from the login location for the second user to the location of the print device.

18. The system of claim 17, wherein the one or more programming instructions that, when executed, cause the electronic device to provide the second user with the indication of the location of the print device comprise one or more programming instructions that, when executed, cause the electronic device to provide the second user with one or more directions from the login location for the second user to the location of the print device.

* * * * *